United States Patent [19]

Music et al.

[11] Patent Number: 4,914,508

[45] Date of Patent: Apr. 3, 1990

[54] METHOD AND SYSTEM FOR COMPRESSING AND STATISTICALLY ENCODING COLOR VIDEO DATA

[75] Inventors: John Music, Irvine; Gordon H. Smith, Santa Ana; James L. Thomas, Placentia, all of Calif.

[73] Assignee: Universal Video Communications Corp., Irvine, Calif.

[21] Appl. No.: 186,637

[22] Filed: Apr. 27, 1988

[51] Int. Cl.$^4$ .............................................. H04N 11/04
[52] U.S. Cl. ...................................... 358/13; 358/133; 358/135; 358/136
[58] Field of Search ...................... 358/11, 12, 13, 133, 358/135, 136, 138, 85; 375/122

[56] References Cited

U.S. PATENT DOCUMENTS

| | | | |
|---|---|---|---|
| 3,414,677 | 12/1968 | Quinlan | 358/133 |
| 3,609,244 | 9/1971 | Mounts | 375/122 |
| 3,767,847 | 10/1973 | Haskell et al. | 358/135 |
| 3,950,607 | 4/1976 | Southworth et al. | 358/134 |
| 3,976,831 | 8/1976 | Dannell | 358/138 |
| 3,980,830 | 9/1976 | Wendland et al. | 358/133 |
| 3,982,063 | 9/1976 | Brown et al. | 358/133 |
| 4,004,084 | 1/1977 | Brown et al. | 358/133 |
| 4,027,331 | 5/1977 | Nicol | 358/135 |
| 4,058,835 | 11/1977 | Kennedy | 358/134 |
| 4,060,832 | 11/1977 | Devimeux et al. | 358/133 |
| 4,090,221 | 5/1978 | Connor | 358/166 |
| 4,179,709 | 12/1979 | Workman | 358/133 |
| 4,210,927 | 7/1980 | Yumde et al. | 358/12 |
| 4,222,076 | 9/1980 | Knowlton | 358/133 |
| 4,261,018 | 4/1981 | Knowlton | 358/133 |

(List continued on next page.)

OTHER PUBLICATIONS

Kato, Mukawa & Okubo, "A Motion Picture Coding Algorithm Using Adaptive DCT Encoding Based on Coefficient Power Distribution Classification", vol. SAC-5, No. 7, Aug., 1987.
Gerken & Schiller, "A Low Bit-Rate Image Sequence Coder Combining A Progressive DPCM On Interleaved Raster With A Hybrid DCT Technique", IEEE Journal on Selected Areas in Communications, vol. SAC-5, No. 7, Aug., 1987.
Chen & Smith, "Adaptive Coding of Monochrome and Color Images", IEEE Transactions on Communication, vol. COM-25, No. 11, Nov. 19, 1977.
Kaneko, Hatori & Koike, "Improvements of Transform Coding Algorithm for Motion-Compensated Interframe Prediction Errors-DCT/SQ Coding," IEEE Journal on Selected Areas in Communications, vol. SAC-5, No. 7, Aug., 1987.
Heiman & Rose, "A Look-Up-Based Universal Real-Time Transformer for Image Coding", IEEE Journal on Selected Areas in Communications, vol. SAC-5, No. 7, Aug. 1987.
Moorehead II, Rajala & Cook, "Image Sequence Compression Using A Pel-Recursive Motion-Compensated Technique", IEEE Journal on Selected Areas In Communications, vol. SAC-5, No. 7, Aug., 1987.

Primary Examiner—Howard W. Britton
Attorney, Agent, or Firm—Fulwider, Patton, Lee & Utecht

[57] ABSTRACT

The method and system of compressing digital color video data in a video communication system utilizes a digital color video signal having three video color components, and the encoding of the color components as compressed color codes in a series of run length and compressed color code combinations. A look up table of compressed color codes representing the most visually significant combinations of three color components may also be modified by a process which involves the determination of a predetermined number of the most visually significant combinations of color components in a picture frame. Line-to-line differences and movement of edges and segments of the picture frames are determined, and frame-to-frame differences are also encoded to reduce the amount of information to a minimum. Further statistical encoding of at least a portion of the run length and color code combinations is also provided.

18 Claims, 8 Drawing Sheets

U.S. PATENT DOCUMENTS

| | | | |
|---|---|---|---|
| 4,302,775 | 11/1981 | Widergren et al. | 358/136 |
| 4,306,249 | 12/1981 | Croll | 358/133 |
| 4,323,916 | 4/1982 | Dischert et al. | 358/13 |
| 4,365,273 | 12/1982 | Yamada et al. | 358/260 |
| 4,394,774 | 7/1983 | Widergren et al. | 382/56 |
| 4,420,771 | 12/1983 | Pirsch | 358/261 |
| 4,455,571 | 6/1984 | Shimizu et al. | 358/138 |
| 4,468,708 | 8/1984 | Coleman, Jr. | 358/310 |
| 4,485,400 | 11/1984 | Lemelson et al. | 358/85 |
| 4,494,144 | 1/1985 | Brown | 358/133 |
| 4,541,012 | 9/1985 | Tescher | 358/133 |
| 4,546,383 | 10/1985 | Abramatic et al. | 358/85 |
| 4,573,074 | 2/1986 | Alaria et al. | 358/136 |
| 4,589,110 | 5/1986 | Eng et al. | 358/133 |
| 4,597,010 | 6/1986 | Carr | 358/136 |
| 4,605,963 | 8/1986 | Reitmeier et al. | 358/133 |
| 4,633,296 | 12/1986 | Cham et al. | 358/12 |
| 4,633,311 | 12/1986 | Gordon et al. | 358/133 |
| 4,654,484 | 3/1987 | Reiffel et al. | 379/53 |
| 4,654,695 | 3/1987 | Fling | 358/11 |
| 4,656,511 | 4/1987 | Koga | 358/136 |
| 4,704,628 | 11/1987 | Chen | 358/133 |
| 4,719,503 | 1/1988 | Craver | 358/13 |
| 4,740,832 | 4/1988 | Sprague | 358/13 |
| 4,758,881 | 7/1988 | Laspada | 358/13 |
| 4,772,938 | 9/1988 | Sasson | 358/13 |
| 4,772,956 | 9/1988 | Roche | 358/133 |
| 4,774,562 | 9/1988 | Chen | 358/13 |
| 4,774,587 | 9/1988 | Schmitt | 358/133 |
| 4,785,349 | 11/1988 | Keith | 358/13 |

× MARKS DECISION POINTS

RED, GREEN & BLUE COLORS AT APEX

RUN LENGTH

METHOD AND SYSTEM FOR COMPRESSING AND STATISTICALLY ENCODING COLOR VIDEO DATA

BACKGROUND OF THE INVENTION

1. Field of the Invention:

This invention relates generally to information signal processing, and in particular to the field of processing time sequential information signals, such as video signals, for the purpose of compressing the amount of information to be transferred from an encoding site to a decoding site. A particular use of the invention is in the communication of color video data over telephone lines for purposes video telecommunication.

2. Prior Art:

Encoding of digital television signals ordinarily requires a transmission rate of approximately 200 Mbits/s. Recent developments in coding systems have permitted the transmission rate to be cut to less than 2 Mbits/s. Coding systems using block oriented analysis of video picture frames and processing by a conventional hybrid discrete cosine transform (DCT) coefficient permit transmission at rates of between 64 Kbits/s and 384 Kbits/s. Such a system is described in Gerken and Schiller, "A Low Bit-Rate Image Sequence Coder Combining A Progressive DPCM On Interleaved Rasters With A Hybrid DCT Technique", IEEE Journal on Selected Areas in Communications, Vol. SAC-5, No. 7, Aug. 1987. Adaptive coding techniques applied to such DCT processing have allowed video data transmission at rates as low as one to two bits per pixel, as is described in Chen and Smith,"Adaptive Coding of Monochrome and Color Images", IEEE Transactions on Communications, Vol. COM-25, No. 11, Nov. 19, 1977. However, information transmitted at such low data rates seriously affects the ability to reconstruct a sufficient number of frames per second so that a real time picture is acceptable to a viewer. High capacity telephone lines are available which will carry transmissions at a rate of up to 1.544 Mbits/s, but such lines are extremely expensive at a dedicated use rate, and are still quite expensive at a scheduled use rate. Lower capacity telephone lines are available which permit transmission at rates of up to 56 Kbits/s and 64 Kbits/s. Relatively expensive video digital and coding devices are commercially available which will transmit a video signal at 56,000 bits per second, so that it is necessary to utilize a combination of a device of this nature with the high capacity 1.544 Mbits/s telephone line to allow a framing speed much faster than about one frame per second. The current transmission rate limit of ordinary telephone lines approaches 18,000 bits per second, so that transmission of real time sequencing of video pictures over ordinary telephone lines has been viewed in the prior art as not being feasible.

Various schemes for reducing the amount of redundancy of information to be transmitted in a digital video signal have been used. One technique is to utilize a slow scan camera; and another technique is to transmit every nth scanning line for each frame. Another technique involves the sending of only those parts of a picture frame which are deemed to be important or to have changed in some significant manner, by dividing the picture frame into a number of segments or blocks which are typically 3×3 or 4×4 groups of pixels, and analyzing the content of the blocks. These techniques tend to also reduce the resolution of the video picture.

Another technique in the reduction of transmission time which does not decrease the resolution of a picture transmitted is run length encoding. In run length encoding, the scan lines of a picture frame are encoded as a value of the color content of a series of pixels and the length of the sequence of pixels having that value or range of values. The values may be a measure of the amplitude of a video signal, or other properties of such video signals, such as luminance or chrominance. An example of a system which utilizes run length coding of amplitude of video signals is U.S. Pat. No. 3,609,244 (Mounts). In that system, a frame memory also determines frame to frame differences, so that only those differences from one frame to the next are to be transmitted. Another example of a method for transmitting video signals as compressed run length values which also utilizes statistical coding of frequent values to reduce the number of bits required to represent data is U.S. Pat. No. 4,420,771 (Pirsch).

Ideally, compression of color video information to allow real time sequencing of picture frames at a rate of up to 15 frames per second, and at bit rates as low as 11,500 bits per second would be desirable, to allow the communication of color video data over ordinary telephone lines. A video data compression system able to achieve equivalent data transmission rates as systems using higher quality telephone lines with more efficient and less costly equipment than is currently available would also be desirable.

SUMMARY OF THE INVENTION

The present invention provides for a method and system for compressing digital color video data in a video communication system, for transmitting a plurality of video picture frames from digitized color video signals in the form of run lengths and three digital color components. Up to a predetermined number of the most visually significant combinations of the color components in at least a portion of the picture frame are determined, and the digital color components in the picture are encoded into a look up table of digitally compressed color codes which are also encoded along with associated run lengths.

Briefly, and in general terms, the method of compressing digital color video data utilizes a digitized color video signal having three digital color components and a run length component, with the run length being of a first digital word size, and the three digital color components being of second, third and fourth word sizes, respectively. The steps of the method comprise determining a histogram of up to a predetermined number of the most visually significant combinations of the color components in at least a portion of the picture frame; encoding all of the digital color components in the picture frame to a look up table as compressed color codes of the most visually significant color combinations of a fifth digital word size which is smaller than the sum of the second, third and fourth digital word sizes; and encoding a plurality of run lengths and the digitally compressed color codes representing at least a portion of the picture frame.

The system for compressing digital color video data is for use in a video communication system for transmitting a plurality of video picture frames, utilizing a digitized color video signal having three digital color components and a run length portion, with the run length portion being of a first digital word size, and the three digital color components being of second, third, and fourth digital word sizes, respectively. The data compression system briefly and generally comprises means for determining a histogram of up to a predetermined number of the most visually significant combinations of the color components in at least a portion of the picture frame. Also included in the data compression system are means for encoding all of the digital color components in the picture frame to a look up table of digitally compressed color codes of the most visually significant color combinations of a fifth digital word size which is smaller than the sum of the second, third and fourth digital word sizes; and means for encoding a plurality of run lengths and associated digitally compressed color codes which represent at least a portion of the picture frame.

In a preferred embodiment, adjacent run lengths on each scan line for which the adjacent run lengths have associated color components which vary less than a predetermined amount are concatenated to a sixth digital word size which may be larger than the first digital word size of the run lengths. Either or both of the run length portion and the compressed color component code portion of the combinations of run length compressed color codes are preferably statistically encoded by determining the frequency of occurrence of values of either or both portions. A plurality of different code tables are provided. The most frequent occurrence of values in a portion is statistically encoded in a first code table by a one bit size digital word. The next three most frequent occurrences are selected and encoded in a second code table by a two bit digital size word, and all of the other values are likewise encoded in at least one additional code table by a digital word size larger than two bits. Provision is also made for optionally encoding line-to-line differences, frame-to-frame differences, and determining and encoding movement of distinctive edges of sequences of combinations of run lengths and compressed color codes from frame-to-frame.

Other aspects and advantages of the invention will become apparent from the following detailed description and the accompanying drawings illustrating by way of example the features of the invention.

DETAILED DESCRIPTION OF THE INVENTION

Figure 1:
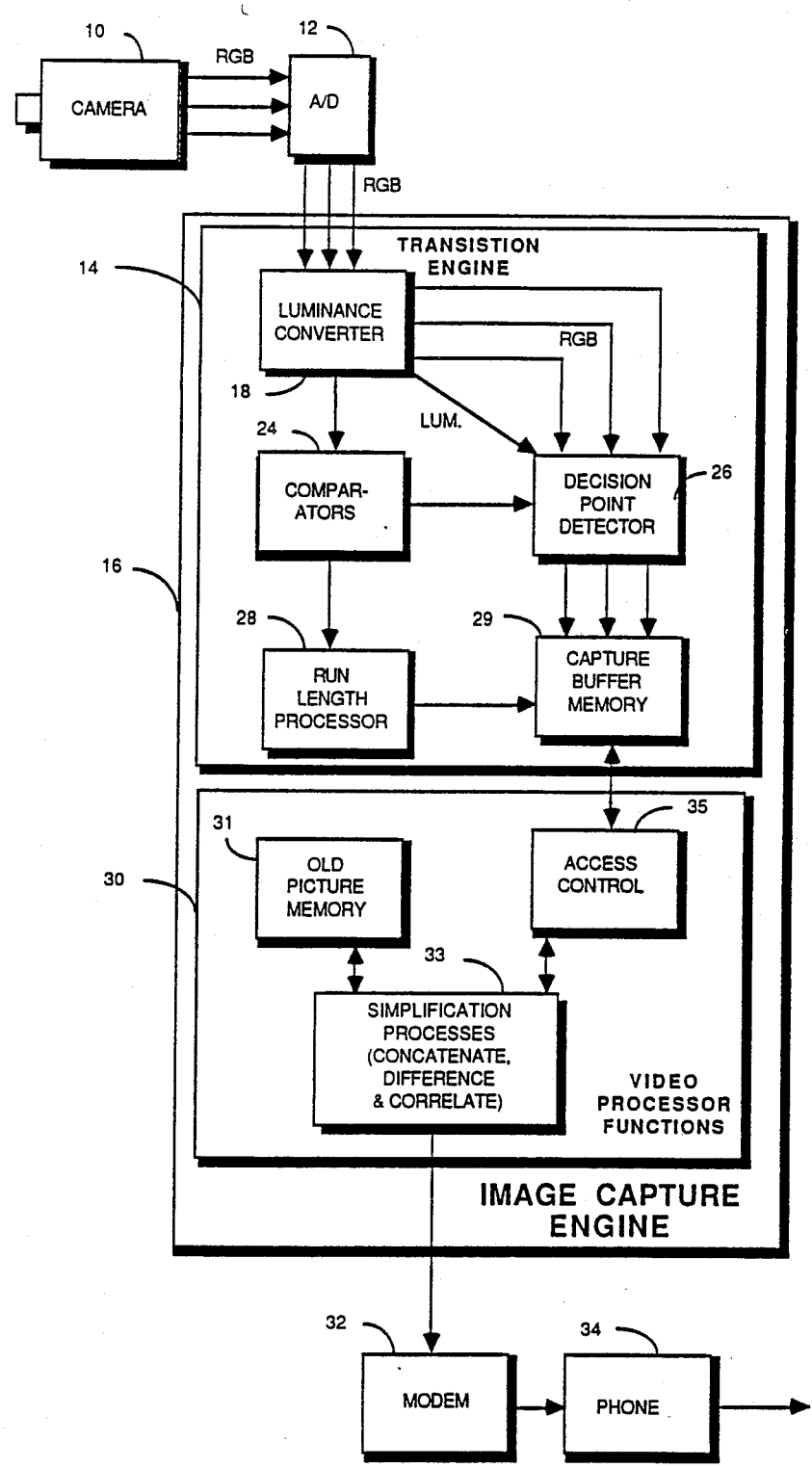
FIG. 1 is a schematic diagram of a system and method for compressing color video data in a video communication system.

As is shown in the drawings for purposes of illustration, the invention is embodied in a method and system for compressing digital color video data in a video communication system for transmitting a plurality of video picture frames. Each picture frame comprises a plurality of scan lines composed of a plurality of pixels, and the digitized color video signal which is used has three digital color components and a run length portion, the run length portion being of a first digital word size, and the three digital color components being of second, third and fourth digital word sizes, respectively. A histogram is created of up to a predetermined number of the most visually significant combinations of the color components in at least a portion of the picture frame. All of the digital color components in the picture frame are encoded to a look up table of digitally compressed color codes of a fifth digital word size smaller than the sum of second, third, and fourth digital word sizes; and the plurality of run lengths are encoded in combination with the digitally compressed color codes. The representation of color with such a limited number of codes allows for a significant reduction in the bit size necessary to represent the color data; and the use of run lengths allows for a further significant reduction in the amount of data required to represent pixels in a picture.

In accordance with the present invention, there is provided a method of compressing digital color video data in a video communication system for transmitting a plurality of video picture frames, with each picture frame comprising a plurality of scan lines composed of a plurality of pixels, utilizing a digitized color video signal having three digital color components, said video communication system including means for determining a luminance function for each pixel; means for determining which of said pixels on each scan line represent decision points based upon said luminance function; and means for encoding at least a portion of said plurality of pixels in each scan line as a plurality of combinations of run lengths and said three digital color components, said run length being of a first digital word size, and said three digital color components being of second, third and fourth digital word sizes, respectively; said method comprising the steps of determining up to a predetermined number of the visually significant occurring combinations of said color components in at least a portion of said picture frame; encoding all of said digital color components in said picture frame to a look up table in a memory means of digitally compressed color codes of said most visually significant color combinations of a fifth digital word size smaller than the sum of said second, third and fourth digital word sizes; and encoding a plurality of run lengths and said digitally compressed color codes representing at least a portion of said picture frame in said memory means.

The present invention also accordingly provides for a system for compressing digital color video data in a video communication system for transmitting a plurality of video picture frames, with each picture frame comprising a plurality of scan lines composed of a plurality of pixels, utilizing a digitized color video signal having three digital color components, said video communication system including means for determining a luminance function for each pixel, means for determining which of said pixels on each scan line represent decision points based upon said luminance function, and means for encoding at least a portion of said plurality of pixels in each scan line as a plurality of combinations of run lengths and said three digital color components, said run lengths being of a first digital word size, and said three digital color components being of second, third, and fourth digital word sizes, respectively, said system of compressing digital color video data comprising: means for determining up to a predetermined number of the most visually significant combinations of said color components in at least a portion of said picture frame; means for encoding all of said digital color components in said picture frame to a look up table in a memory means of digitally compressed color codes of said most frequently occurring visually significant color combinations of a fifth digital word size smaller than the sum of said second, third and fourth digital word sizes; and means for encoding a plurality of run lengths and said digitally compressed color codes representing at least a portion of said picture frame in said memory means.

As is illustrated in the drawings, in a preferred implementation of the invention, the video communication system is capable of producing a color video picture using an RGB video camera, generating an analog RGB signal at the normal 60 fields per second, with each field representing half of the picture in an interlaced mode. The signal for the video picture frames generated by the camera 10 is received by an analog to digital converter 12, which converts the red, green and blue (RGB) analog components into digital RGB components, which are each digitized as six bit digital words, forming packets of bits for the RGB components for each pixel of the color video picture of eighteen bits.

The type of the device used to generate the source color video picture is not crucial to the invention, as a camera generating a standard NTSC composite signal which is converted to an RGB digital output would also be suitable as would a field rate differing from 60 fields/sec. The output of the camera also does not need to be strictly RGB, since other three color component groups may be used to create and transmit color video pictures. For example, the tree digital color component signals may be cyan, magenta, and yellow; hue, saturation, and intensity; or even two distinct colors and a third parameter based upon the entire video signal, such as hue, saturation or intensity of an original analog video signal, so that there would be some automatic weighting of the color information generated by the camera.

It is also not essential that the three color components be represented by the same number of bits, since it is known in the television industry that certain ranges of colors are not as easily perceived by the human eye. Such a weighting of information could involve a reduction in the number of bits used for the red component in an RGB scheme, for example, thus permitting transmission of more gradations of other color information that is actually perceptible.

In addition, the source of the color video pictures to be compressed may be a storage means, such as a video disk, a computer file storage media, a video tape, or the like from which the color video information can be processed for introduction into the color video data compression system of the invention.

The digitized RGB signal is received by the transition engine portion 14 of the image capture engine 6, which preferably includes integrated circuit means and associated memory means. The first major part of the image capture engine is the transition engine which includes circuitry for determining a luminance function based upon the three color component video signal for each picture element, or pixel, of each scan line in the sequence of video picture frames generated by the analog front end of the system. In the preferred mode, the luminance converter 18 sums the bits from each of the three digital color components for each pixel in the scan lines of the video picture frame to get a luminance (or intensity) value and performs further processing of the data obtained. In the system of the present invention each scan line preferably contains 480 pixels, which matches the resolution of the camera and which provides for better resolution than is typically available in the prior art, in which generally only 256 pixels are utilized per scan line. The luminance of the three color components may be weighted to give greater significance to one color or two colors to provide the luminance function, and may also be based in part upon an original source analog video signal. However, the luminance function is preferably based in part at least upon the sum of the three digital color components. The luminance function derived from the sum of the three six bit color components therefore has a digital word size of eight bits. This luminance function for each pixel is utilized in the input capture engine for evaluating one or more decision parameters based upon the luminance function for determination of those pixels which operate as decision points about which the one or more of the decision parameters are found to vary from a prestored set of threshold values.

The luminance function is an excellent indicator of color changes in the picture, or movements of objects in the picture. In the image capture engine the one or more decision parameters based upon the luminance function may also be used as the basis for determination of differences from line to line, and of distinctive sequences of pixels which define edges of objects which can be determined to be moving from frame to frame. Generally, the luminance, or other combination of color components which comprise the luminance function, undergoes significant changes where there are changes in the characteristics of the picture.

The camera also introduces anomalies or artifacts into the video picture due to noise in the color sampling resolution which ideally should be eliminated to reduce the amount of data to be transmitted since they contribute nothing beneficial to the picture. When the picture is displayed with a new field every 60th of a second, the effect of such anomalies is averaged out by the human eye. Areas having a smooth appearance and little actual detail upon close observation seem to "crawl". This appearance is also known as the "mosquito effect". When a picture is frozen so that only one field or picture frame is being examined, the picture takes on a grainy, speckled appearance. The impact of the noise on the luminance data is in the form of tiny variations in the computed luminance. When the picture is digitized, the digitizing process also converts all of these artifacts to digital representations, even though they do not actually represent picture detail. The processing of luminance in the image capture engine operates to eliminate such meaningless details.

One preferred method eliminating the non-essential details caused by noise in the luminance data is to determine the points of change based at least in part on the luminance function for pixels in the scan lines by comparing differences in one or more decision parameter with corresponding adaptive thresholds. This is termed feature encoding. The decision parameters are preferably comprised of differences of the luminance function between pixels, determined between proximate pixels (Diff-1) in a scan line, n plus one n plus two, or even a further distance away, where n represents the position on a scan line of the pixel being examined for changes in luminance; between adjacent first differences (Diff-2), and a cumulative parameter (Cum-diff) which is a sum of the individual difference functions Diff-1, and Diff-2. Each decision parameter has its own corresponding adaptive threshold, having a default value which is subject to modification by the system in response to operator settings. The adaptive threshold preferably has a default value which may be adjusted by the input capture engine responsive to operator or processor selections for resolution. The selecting of the threshold parameters for determining either the feature or transition decision points is quite subjective. The selection of the parameters determines the number of data points required to define the picture and it also determines the overall perceptual quality of the picture.

Typically for the feature run length determination, two thresholds are used. One is the cumulative change in luminance since the last decision point, Cumdiff. Cumdiff will trigger a decision point if it was greater than 6 and the number of pixels since the last decision point was greater than 5. Another decision parameter is the sum of two adjacent difference values, Diff2 (this is the same as the difference between luminance values that are two pixels apart). If the Diff2 value is computed to be greater than typically 32, the logic will signify that the line is entering an edge, which identifies a decision point, and will stay in the edge characteristic until the Diff2 value falls below 20. When the edge mode is exited, the color of the next pixel is carried all the way back to the pixel where the starting edge determination was made. Also, if Diff2 changes sign, it signifies a new decision point. Changing the values for the cumdiff thresholds greatly affects the quality and data complexity of the picture.

In the slope determination of decision points (apexes), three general conditions are used. An initial slope is determined at the decision point and all measurements are base on that slope. The initial slope, IINITS, is determined by computing the following function termed NDIFF2:

$$NDIFF2 = (luminance_{(i+2)} - luminance_{(i)})/2$$

INITS is the value of NDIFF2 immediately after the decision point.

CUMDIFF in the slope case is defined the following way:

$$CUMDIFF_{(i)} = CUMDIFF_{(i-1)} + NDIFF2_{(i)}$$

If the absolute value of the CUMDIFF is typically greater than 20 and the number of pixels in the run length is typically greater than 10, then a decision point will be triggered. Similarly, if the absolute value of NDIFF2 is less than or equal to typically 4 and the run length is typically greater than 5, a decision point will be triggered unless the last decision point was also triggered in this manner. The third decision parameter is also based upon NDIFF2:

$$TRIGVAL_{(i)} = NDIFF2_{(i)} - INITS$$

The threshold for TRIGVAL is usually set in the range of 4 to 10 and will trigger a decision point any time the absolute value reaches or exceeds the set value and the run length is at least 2 pixels. Other techniques may be used but these seem to give good quality pictures with an acceptable number of data points.

Figure 2:
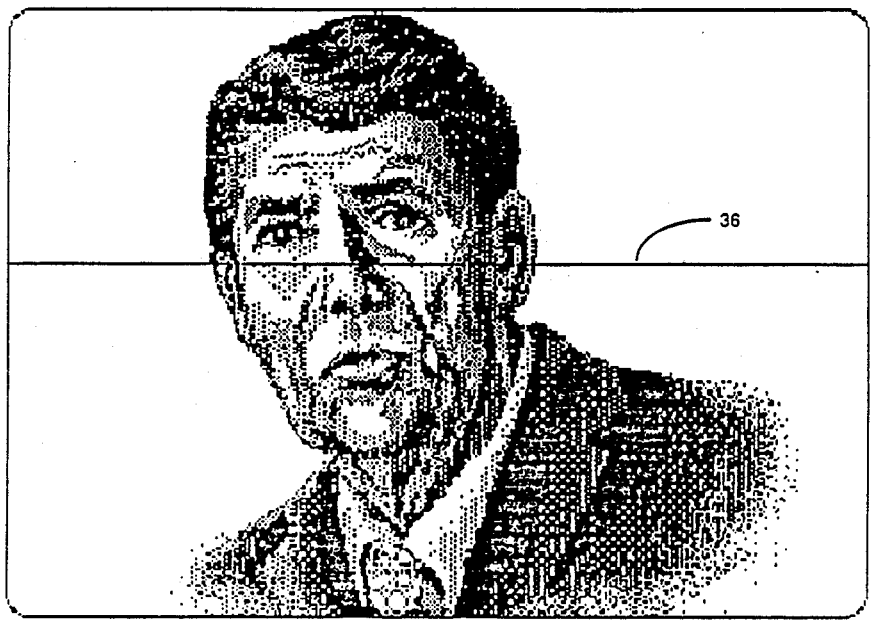
FIG. 2 is a luminance plot across one scan line in a video picture.
Figure 2:
Figure 3:
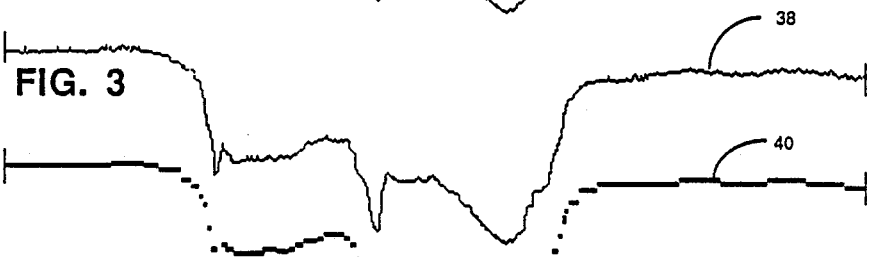
FIG. 3 shows a run length representation of features in a video scan line.

A graphic representation of a typical plot of luminance across a line of a video picture is shown in FIG. 2. The luminance function of the pixels intersected by the scan line 36 is graphically represented by line 38. As is shown in FIG. 3, a graph of the decision points based upon comparison of one of the decision parameters with the corresponding adaptive difference threshold in a feature encoding technique, results in stepped line 40, a sequence of horizontal straight lines across the luminance pattern. Each horizontal line represents a separate length of a specific color.

Figure 4:
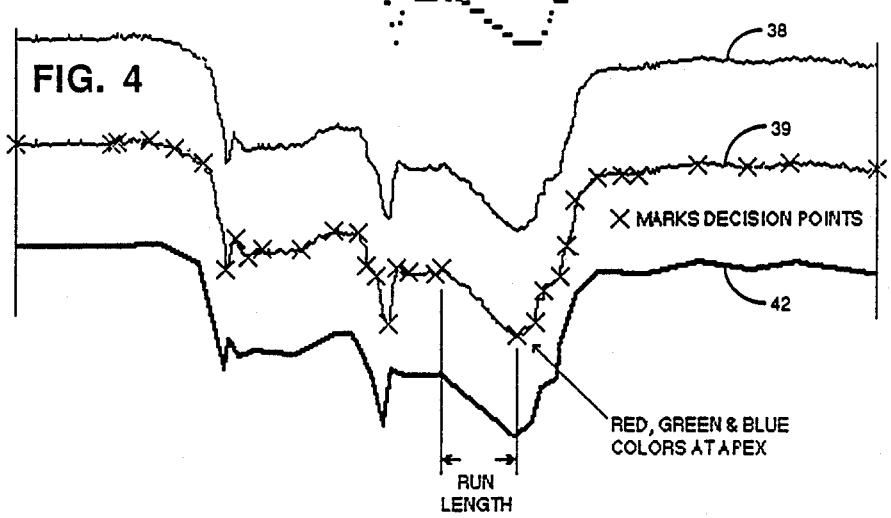
FIG. 4 shows a run length representation of transitions about slope decision points of a video scan line.
Figure 5:
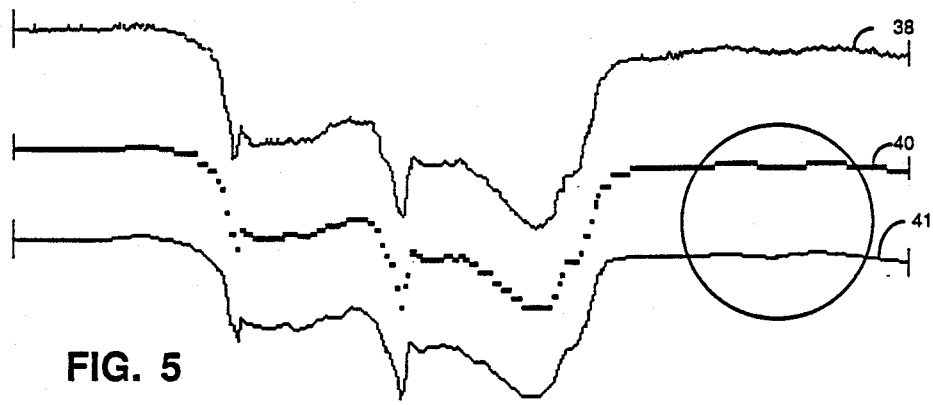
FIG. 5 shows a representation of the reconstructed video scan line for display.
Figure 6:
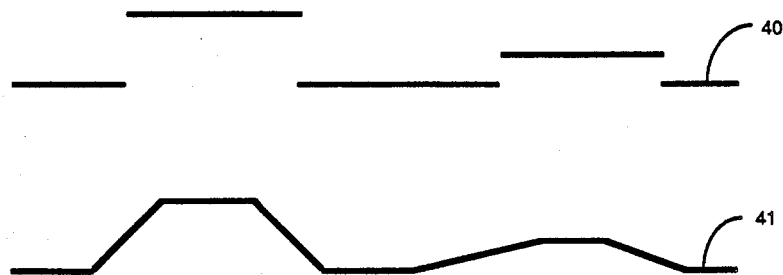
FIG. 6 shows a representation of how the run length data is converted to display data with transitions between runs.

A second approach which may be used to eliminate the non-essential details is a transition or slope encoding technique, which is illustrated in FIG. 4. In this technique the rate of change of the differences in the decision parameter between pixels is determined, and the rates of change of these differences are compared with an adaptive, prestored difference rate of change threshold to determine decision points or apex points. These change points or decision points are indicated as X's on line 39. They indicate the location of the next apex. "Run length" is the pixel distance between decision points, for both the feature encoding and slope encoding techniques. According to the transition or slope encoding technique, the luminance data results in a line 42 representing a series of apexes or slope decision points, which may be used for controlling the color segments between decision points. A drawing engine can produce a smooth transition of color values for the run length between decision points when the encoded information is to be retrieved. In this technique, for each scan line an initial color is transmitted, followed by as many sequences of run length and color values as are necessary to represent the picture frame content. In either implementation the information is displayed as a series of slopes. For the run length encoded data artificial color slopes are inserted into the display line as shown in FIG. 5. In this case the slopes are generated as a function of the luminance shift between runs and the length of the adjoining runs as shown in FIG. 6.

In the image capture engine of FIG. 1, the decision point detector 26 for determining decision points may alternatively be able to utilize either one of these methods for fixing the decision points in the color of the pixels in the picture, as each method has its respective advantages and disadvantages. The feature coding technique is typically more appropriate for pictures with a complexity of objects with distinctive edges or lines. On the other hand, the slope encoding technique is most suitable for encoding gradual transitions in shading or gradual color changes, but may require additional coding to represent complex pictures with images having many edges and lines. In the preferred implementation of the slope encoding technique, a sequence of thresholds will be compared with decision parameters, and the cumulative parameter (Cum-diff) and an adaptive cumulative threshold will also be utilized in determining decision points, to account for those slow, gradual rates of change of luminance which would still result in an accumulated luminance change which is significant enough to merit identification of a decision point.

The three component color codes are also operated on in the run length processor to drop the two least significant bits from the six bit values for the color components, reducing each of the color components in the preferred mode to four bit digital words. Alternatively, in one preferred embodiment, the transition engine may also contain a predetermined color map representation of three-component colors, with an n-bit code corresponding to a particular color combination. Here, the colors of the image are matched as closely as possible with the colors in the color map. As a further alternative, the color codes could also be rounded. These truncated or reduced digital color components are then encoded with the run lengths between decision points in the run length processor 28. Although the preferred bit size for the reduced color components is four bits, just as the input digital word size for the color components from the analog front end can be of different sizes to vary the informational content, the reduced digital color components may also be of different sizes. A particular combination of digital word sizes for color components may include a reduced size for the red component, due to the recognition in the industry of the reduced perceptibility of this component.

The feature and slope encoding techniques allow for a variable number of bits to be used to represent an initial picture frame and then changes in subsequent picture frames, in order to encode the minimum number of bits for each picture frame. This is significant a improvement over the prior art which typically analyzes a four by four or three by three block of pixels to compress the information in such a block, which always results in the same number of bits being utilized to represent the informational content in the picture, whether there have been changes outside the segment or not.

The second major portion of the image capture engine is the capture buffer memory (CBM) 29, which receives the encoded run lengths and reduced color components representing some 200 lines of data from the picture frame. Alternatively, if the data rate required becomes too high to send pictures at a desired speed, lesser numbers of scan lines can be stored, such as 150 or 100 lines. The run length and color component information in the capture buffer memory is then transmitted to the video data processor 30, which accesses the run length and color data in the capture buffer memory by an access control 35, and operates as an interface to transform and transmit the video information in a format suitable for transmission by the modem 32, connected to the telephone 34, and which may include means for further compressing the video data, at 33. The video data may also be compared with a previous picture frame stored in an old picture memory 31.

It is possible in a simplification processor 33 of a video data processor 30 to further analyze the difference between color values of pixels after the color codes have been truncated to provide the reduced color component codes, and to concatenate run lengths of such reduced color component codes which vary less than a given threshold value, or to further concatenate run lengths of the reduced color codes based upon variance of one or more of the decision parameters with respect to a corresponding threshold. As the run length code is typically at a maximum of four bits to be compatible with run length and color code combinations of 16 bits, with 16 bit computer buses in the current implementation, concatentation of a sequence of pixels for each run length would be expected to permit coding of up to sixteen pixels per run length. However, in the current implementation the values 0 to 15 are used to represent run lengths of from 2 to 17 pixels, since run lengths of 0 and 1 are not meaningful. Alternatively, longer run lengths may be determined initially as well, as may be compatible with different capacity computer buses, to permit run lengths of greater than 4 bits and run length color code combinations greater than 16 bits.

As mentioned previously, it is expected that the limits of compression required for adequate smoothing of information in a real time sequencing of video pictures in telecommunication would be about 15 frames per second for transmission over conventional telephone lines. It would be possible to use a modem at 1200 bps (bits per second), but this would considerably slow the number of frames per second possible in the communication system. Ideally, the system is configured for half duplex mode, and a full duplex mode of configuration would be expected to require two telephone lines. Ideally the modem that is to be used is one which would utilize the largest bandwidth possible, and may be conventional 2400 bps or 9600 bps modem or special modems providing higher bit rates may be used.

Figure 7:
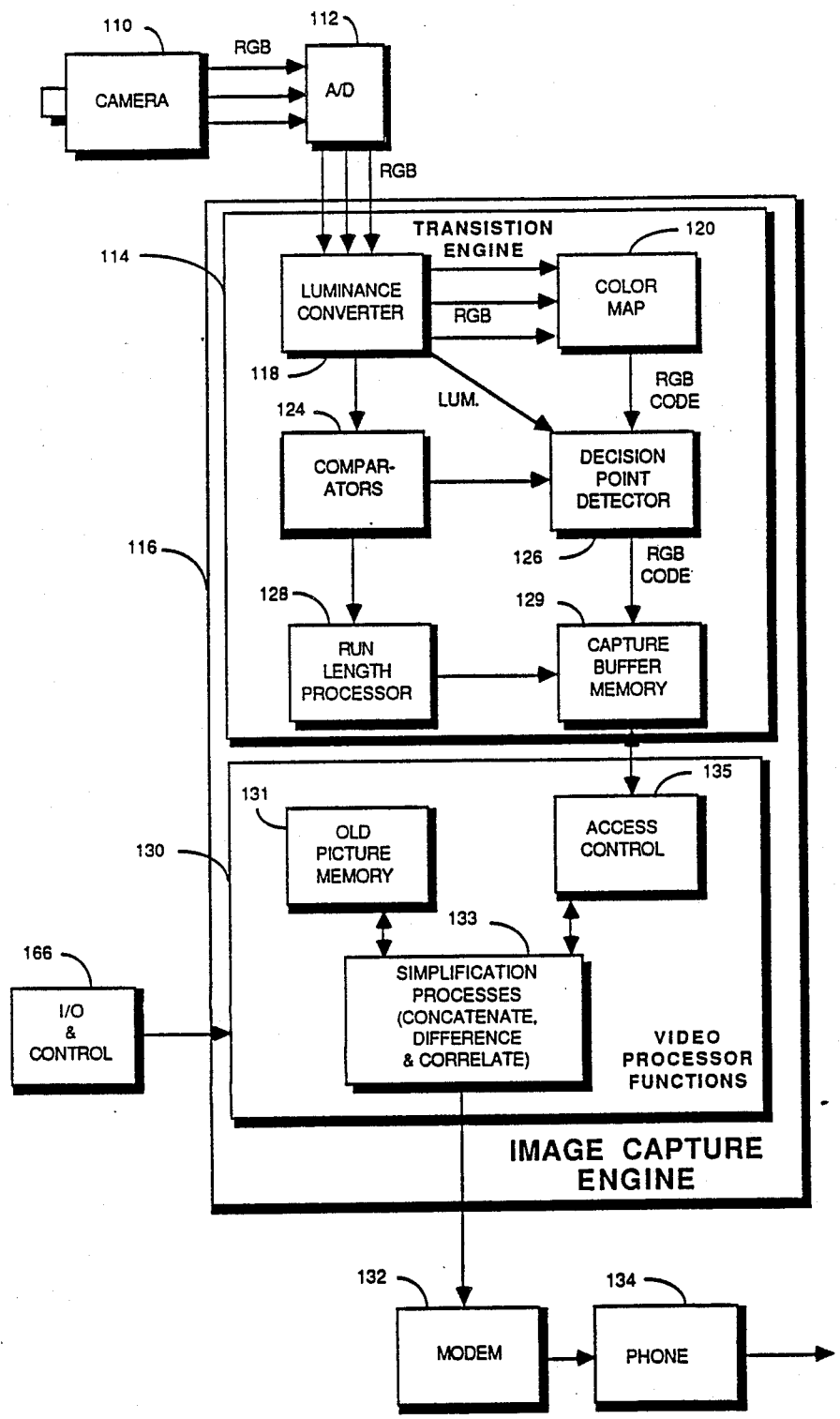
FIG. 7 shows the system and method for compressing color video data in a video communication system including the additional processor subsystem.

With reference to FIG. 7, the output from capture buffer memory 129 is received by the processor subsystem 130 having standard input and output and control 166. The standard I/O 166 typically might include a keyboard, diskette control, a date and time clock, and a monitor output and control. Output from the processor subsystem 130 is typically connected to a modem 132, which is in turn connected to a telephone 134 for transmission of the compressed information over ordinary telephone lines.

Figure 8:
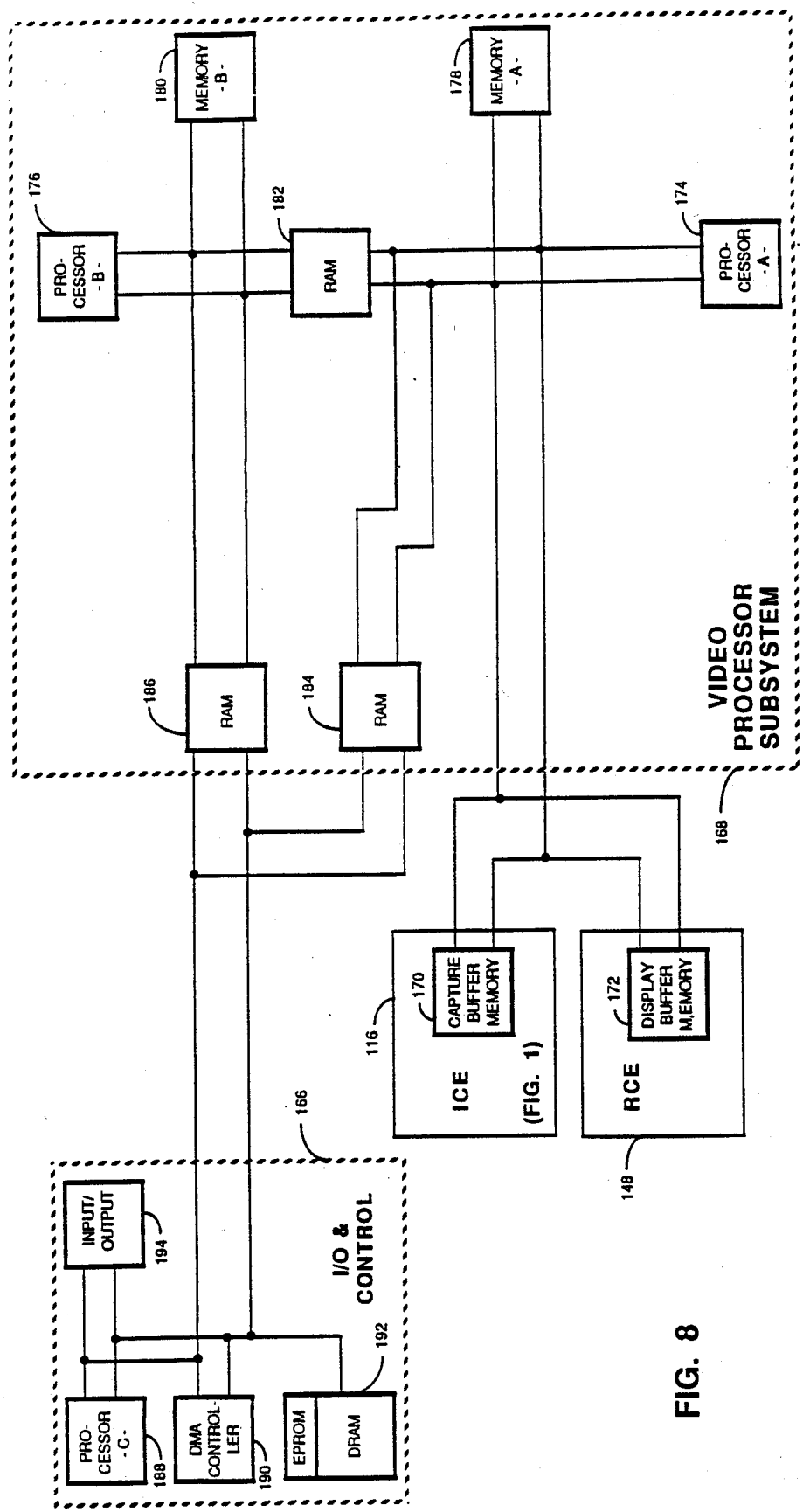
FIG. 8 is a more detailed schematic diagram of a combined I/O control section, processor section, and input construction engine and reconstruction engine.

With reference to FIG. 8, the video data processor subsystem 168 is most preferably adapted to be connected to both an input construction engine (I.C.E.) and a reconstruction engine (R.C.E.) for use in compressing and decompressing video color data in a two-way communication system. However, where the processor subsystem is being used for compressing the color video information, it should be apparent that the reconstruction engine need not be connected to the same processor subsystem as is connected to the input construction engine. If a video communication system is configured so that the input construction system circuitry is part of a camera, and the reconstruction engine circuitry is part of a display monitor, different processor subsystems would generally be utilized by the input construction engine and the reconstruction engine.

As is illustrated in FIG. 8, the shared video data processor subsystem receives input from shared capture memory buffer 170 for receiving input from the input construction engine, and preferably also sends output to a shared display memory buffer 172 which contains section 154, 158 and 160 of the drawing engine, for output to the reconstruction engine. Each of these memory buffers requires sufficient capacity to avoid overflow the encoded information, and it has been found in practice that a memory space of 32K by 16 bits is adequate for these purposes. Memory buffer 170 is also preferably shared for input and output between the image capture engine and the video data processor; and the memory buffer 172 with its dual pingpong memory section is similarly shared for input and output between the reconstruction engine and the video data processor. The processor subsystem includes two microprocessors, which are preferably Motorola 68020 32 bit processors, processor "A" 174, and processor "B" 176. As processor"A" typically performs most of the processing functions of the processor subsystem, it is provided with a private data memory "A" 178 of 512K bytes. Processor "B" is provided with a lesser amount of memory in memory "B" 180 of 256K bytes. Also provided between processor "A" and processor "B" for communication between the processors is a dual port ram 182 of 16K bytes. Dual port RAMS 184 and 186 of 32K bytes are also provided as buffers between processors "A" and "B" and the I/O processor section 166.

The microprocessor "C" 188 for the I/O control section 166 is preferably an Intel 80286 having DRAM refresh and a direct memory access 190 for diskette control and a DRAM 192 of 512K bytes. Input/output ports 194 are designated generally for the standard I/O, which may include disk drives, keyboard, a monitor, and the like.

Figure 9:
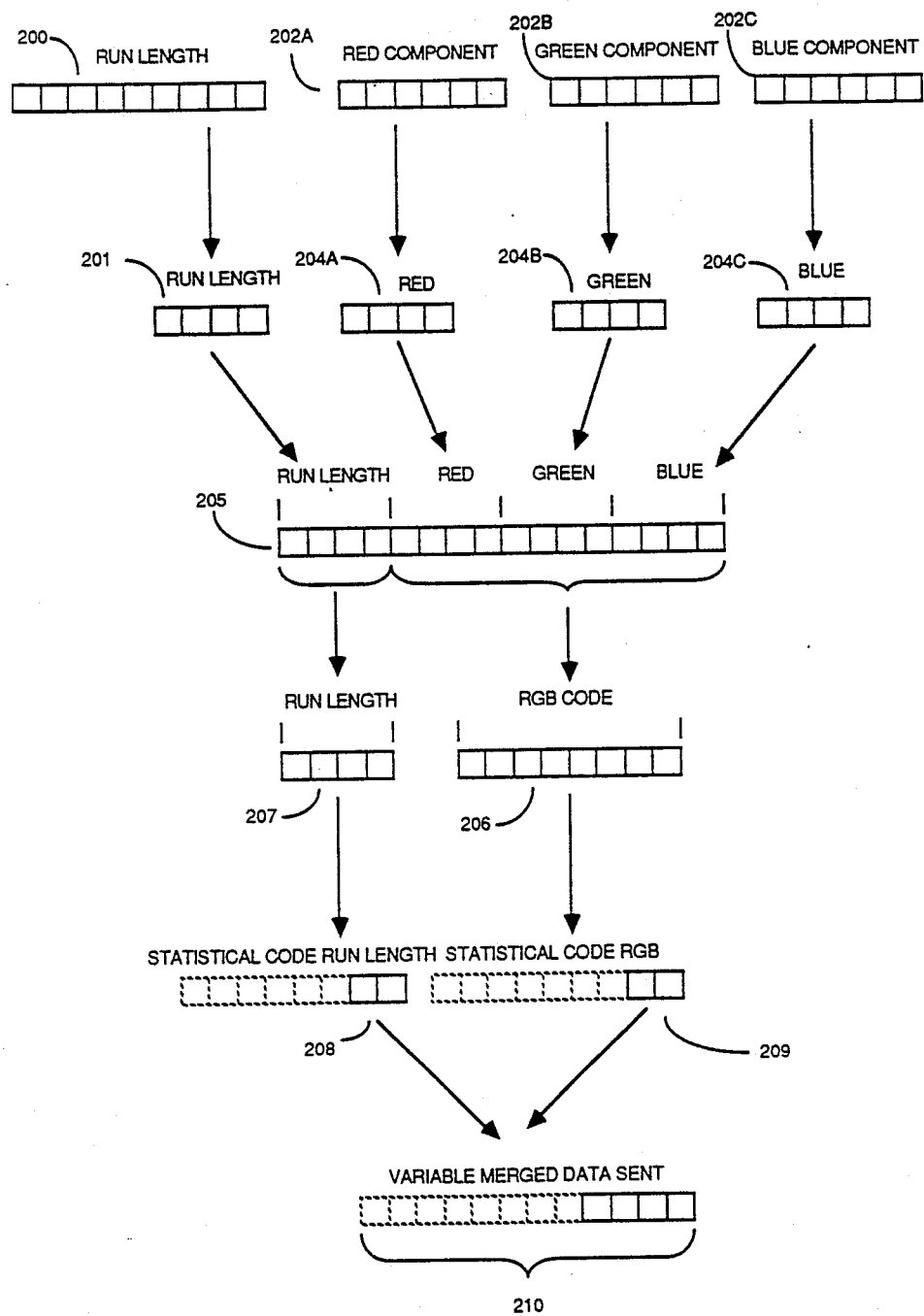
FIG. 9 is a flow diagram illustrating the compression of digital word sizes of run length and color components.
Figure 10:
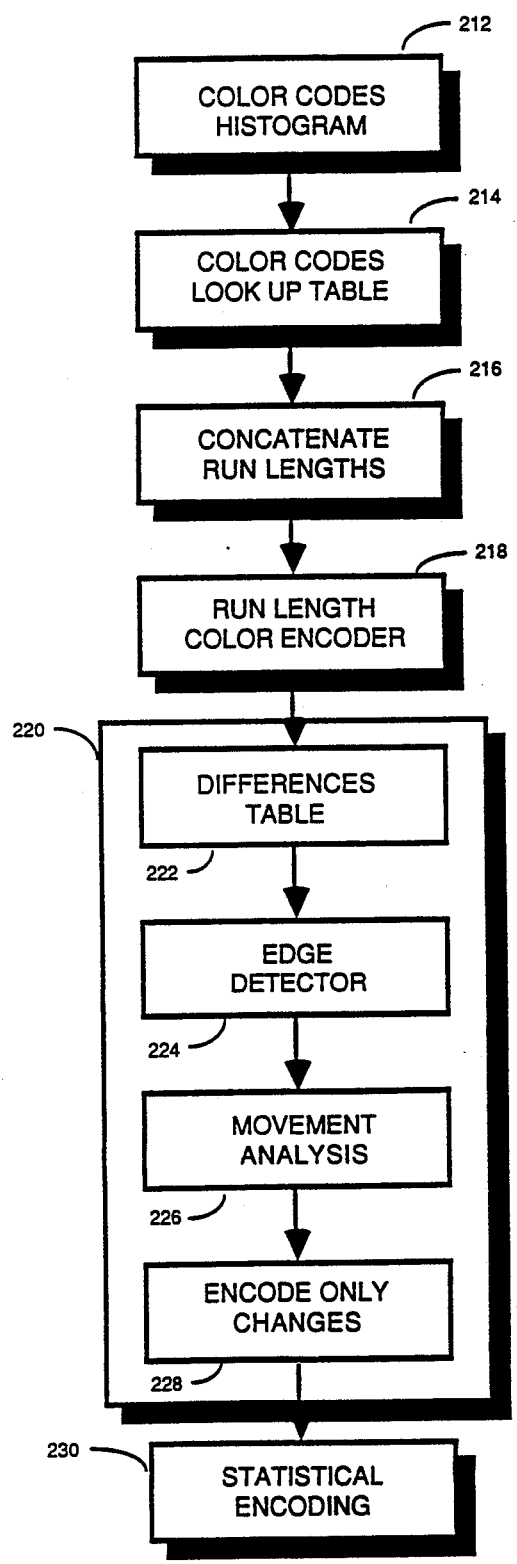
FIG. 10 is a flow chart illustrating the additional signal processing of color video data.

With reference to FIGS. 7, 9 and 10, the operation of the input construction engine and the processor subsystem 130 having simplifying and compressing functions will be described. The run lengths 200 of a sequence of pixels in a scan line having like color values are determined as nine bit digital worlds which are divided in the input construction engine as four bit digital words 201. The RGB color components 202a, b, c as utilized for determining the luminance functions in section 118 are six bit digital words used for determining decision points for run lengths in the decision point logic 126. These colors are truncated by removing the two least significant bits from each six bit word in the color code truncation circuitry 120 to form four bit digital words 204a, b, c. The run length encoder 128 maps a series of run length and RGB color code combinations 205 to the capture buffer memory 129, in preparation for the further processing of the processor subsystem 130. In the preferred embodiment of this invention, a predetermined default color map 214, in the color code section 120 consisting of a look up table of unique combinations of the three color components such as RGB values and corresponding eight bit codes, maps 256 of the most visually significant color combinations out of a possible 4,096, obtained from the three RGB truncated four bit codes. The color map is preferably alterable by the video data processor subsystem.

The 256 color code combinations to be included in the color map are determined on the following basis. Given that each RGB color component is represented as a four bit code, a range of 16 gradations of each color component is possible. However, in practice the colors at the extremes of each range of gradations rarely appear in images captured by a video camera. Statistical surveys of a wide variety of scenes captured by video cameras reveal a common distribution of colors. To illustrate the distribution, a two-dimensional chart of a range of from 0 to 16 of green downward along a vertical axis, with a range of from 0 to 16 of blue to the right across a horizontal axis yields an oval shaped pattern in the middle, along an axis from 0,0 to 15,15. Adding a third dimension of red yields an sausage-shaped distribution of the most visually significant color combinations from a wide variety of possible scenes and images. A combination selected from an extremity of this sausage-shaped distribution has been found to be virtually indistinguishable from a color combination at a nearby extremity of the three-dimensional color block, and within the sausage-shaped distribution, color combinations proximal to each other are also virtually indistinguishable. By careful selection of 256 representative color combinations from blocks within this sausage-shaped distribution, a color map can thus be constructed of the most visually significant color combinations likely to be encountered. In practice it has been found that an RGB ratio of 4:3:2 produces colors in the skin tone ranges, and this information can be used to balance the color ratio distribution, with the primary factor being subjective appearance.

Figure 11:
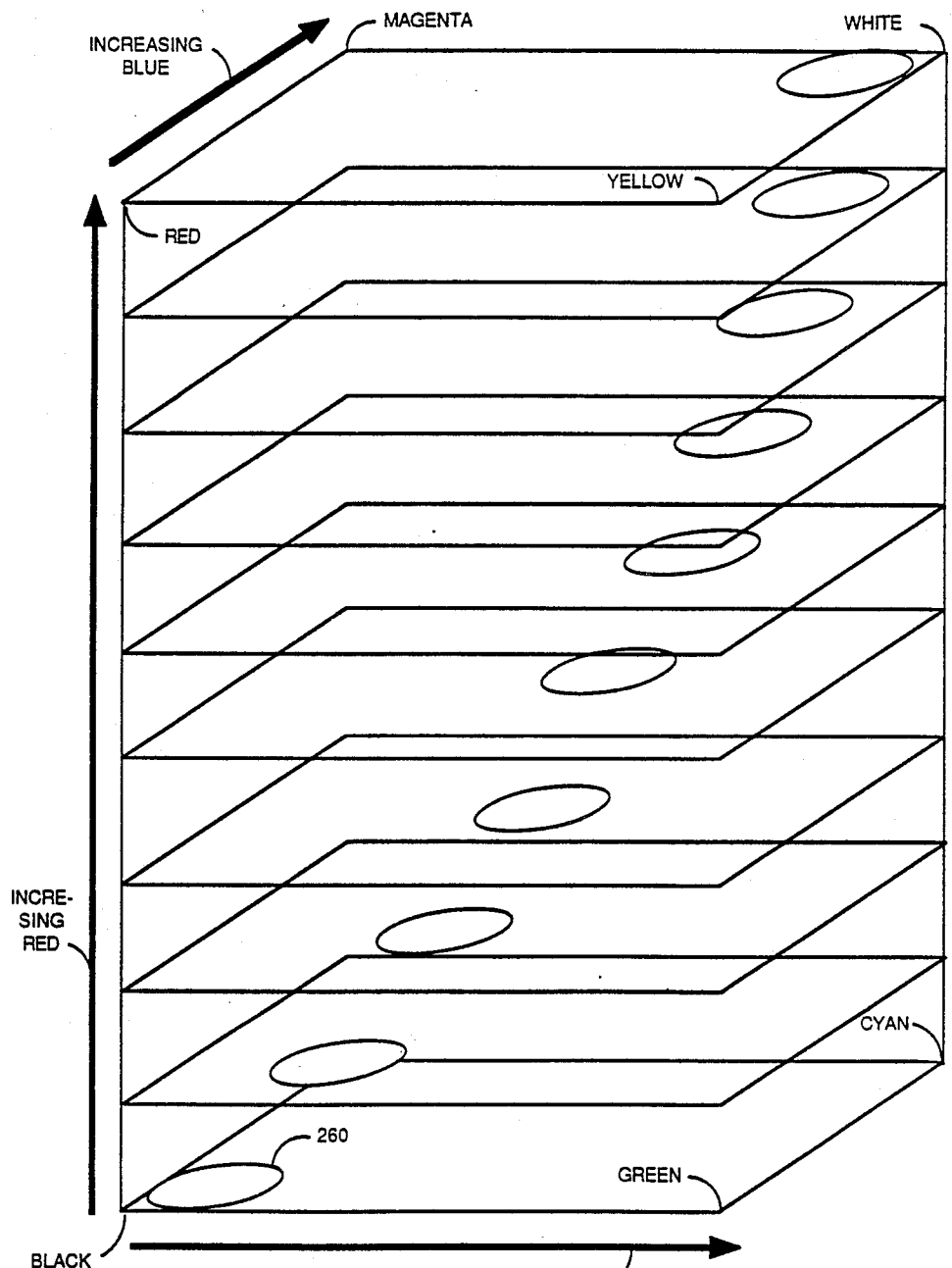
FIG. 11 is an illustration of a three-dimensional color cube.

The color mapping process makes use of the observation that most colors that occur in nature are not very pure. FIG. 11 shows a color cube with no color, black, in the front lower left corner and white which is the maximum red, green and blue in the upper right back corner. Green increases to the right from the black, all zeros, origin. Blue increases from the black toward the lower left back corner and red is represented by a number of planes representing constant levels of red. The red increases in the direction of the top of the cube. Thus all of the possible colors may be represented in the cube to a precision which is dependent on the number of bits allocated to each color component. Any specific color may be represented by the coordinates of any point within the cube.

All of the real colors seem to be heavily bunched along a sausage shape which runs from the black corner in an upward arc to the white corner. Since the colors are concentrated with no natural colors occurring in the pure red, green, blue, magenta, cyan or yellow corners, it is possible to reduce the number of color codes form the 4096 possible prepresented by 4 bits each of red, green and blue. The ovals represented by 260, identify the areas which must be reproduced with some precision because the real colors concentrate here.

It is really only necessary to have flesh tones be faithful reproductions with slight off-colors in other areas being quite acceptable since the persons on the receiving end do not know exactly what colors were present in the transmitting end of the system although a correction process may be applied if it is important. The approach for generating the color map has been to define fine gradations in color in the flesh tones with more coarse gradations the further the captured color is away from the central "sausage". The map was empirically derived from examining the color distributions in a large number of pictures and adjusting the map parameters to get acceptable results. The correction process consists of analyzing the actual colors which occur in each of the map areas and correcting the map segment so that it more faithfully represents the detected colors in that scene. The process is quite subjective but seems to work well.

In the processor subsystem, a histogram of the RGB color codes 212 is statistically processed for all of the run length combinations to update the color map 214 to be used as a look up table. Even with the four bit color codes for each of the RGB components, up to 4,096 different color combinations would be theoretically achievable. In practice, it has been found that a group of carefully selected 256 color combinations is quite adequate to serve as apex colors for the drawing engine to construct the image with up to 262,144 colors with six bit color reconstruction of each of the three color components. Alternatively further gradations are possible by reconstructing each of the three color components as eight bit codes. Therefore, the histogram of 256 of the most frequent RGB color combinations may be used to modify the colors encoded as a series of eight bit digital words in the color code look up table or color map 214. Since each color combination in the color map represents a block of ranges of colors, the color frequency histogram may be used to substitute a more frequently occurring color combination within its color block as a representative color combination, for more faithful color reproduction. As these representative colors are within the color block for those colors, the substituted colors are determined by the system are visually significant, and are not merely selected upon frequency of appearance in the picture.

The RGB color information requirement for 12 bits to represent the maximum of 4,096 colors is thus reduced to a table of 256 8 bit digital words to represent the 256 most visually significant colors. Less frequently occurring colors which may be over the limit of 256 colors may also forced to conform to the same coloration as the nearest color code combination in the color map, without significant lessening of the accuracy of the colors in the picture frame to be transmitted. Once the color codes are in the form of eight bit digital words 206 which may be combined with the four bit run length portion 200, the four bit run length code, which actually represents a run length of from 2 to 17 pixels in the preferred implementation of the encoding of run lengths, can be statistically processed to provide a varying length digital word 208 to be assembled in the eventual fully processed run length color code combination 210. The run length codes may vary from one bit for most frequent lengths up to 8 or 10 for rarely occurring lengths. Thus, the run length may represent from 2 to 257 pixels, which would be theoretically adequate to represent an entire scan line of 512 pixels in two run length color code combinations. Thus, the four bit run lengths are concatenated where possible at 216 finally before encoding the run length and color code combinations at 218. In order to accommodate the encoding of the eight bit RGB color components in the run length combinations, it is also necessary to construct and encode the color code look up table 214 as a table of 256 individual four bit color codes for each of the RGB components, which would be transmitted with the color code run length combinations to enable a receiver or translator of the picture information to decode compressed color information.

More advanced processing and compression of the run length color code combinations may also occur in the advanced processing section 220. Similar to the pixel to pixel differencing and comparison for determination of decision points in the input construction engine, adjacent scan lines may be compared to formulate a table of scan lines which do not differ from the previous scan line in the direction of scanning, so that the lines or portions of lines may be merely duplicated. Thus, this would allow further compression of the run length and color code combinations 210 as a differences table 222. Another technique termed subframe processing may be used to reduce the amount of data which must be sent to update a new picture on the receiving section of a system. This subframe processing technique samples every nth line and continues processing only with those lines for any one image. Distinctive segments of run length combinations which appear to form an edge may be detected in an edge detector 224 to monitor the displacement of such segments from frame-to-frame by movement analysis 226, which preferably could track the movement of such scan line segments in groups of scan line segments according to any horizontal shifting, shrinking, growing, or vertical displacement of such segments, or virtually any combination of such movements. A further level of compression involves the frame-to-frame differencing by comparison of the run length and color codes combination information from the last picture frame with the current picture frame, and encoding of a skip code to identify those portions which have not changed, so that only the run length and color code combinations which have changed are encoded at 228.

Finally, the processor subsystem also preferably encodes the run length and color code combinations to be transmitted from the processor subsystem by determining a histogram of the occurrence of run length and color code combinations. The preferred form of statistical encoding at this stage is similar to Huffman coding, and involves the assignment of the most frequently occurring combination to a table of one bit digital words, at 230. This table is to be utilized at the receiving end of the system by referring to one or the other of the bit states of the one bit digital word to fill in this most frequently occurring run length combination in a corresponding run length color code table. For example, if the table indicates a binary one, the receiving table would be filled in with the run length color code combination, and would otherwise be left with a marker of zero indicating that the spot in the table was to be filled in later. The next three most occurring combination are then represented as a two bit length digital word, with one of the binary bit states again indicating that the receiving table location was to be filled in later, and the next three most frequently occurring combinations are filled in their respective locations in the corresponding receiving table. A three bit digital word table can then be constructed in a similar fashion to designate the next seven most frequently occurring values, with one of the binary bit states representing values to be filled in later, and so on, with a final digital word size of eight bits used to represent the remaining color code combinations. This process may be applied to other groupings than the 1, 2, 3, n bit grouping sequence described above. Most preferably, this statistical encoding of the compressed run length color code information is performed for at least the color codes, individually, with the run length portions then being encoded and received as a separate table of eight bit digital words, but it is also possible to separately statistically encode the eight bit run length portions in similar fashion and transmit a separate statistically encoded table for the run length components of the run length-color code combinations. Other similar statistical encoding approaches may also be appropriate as an alternative.

In the foregoing description, it has been demonstrated that the method and system of the invention result in a compression color video data by the truncation of least significant information from the color component codes, and the statistical encoding of the most visually significant color code combinations. Further processing of the color video data allows the further compression of the data by encoding concatenated run lengths, line-to-line differences, movement of segments of picture frames and portions of picture frames which have changed to reduce the amount of information to be encoded to the minimum amount. The invention further provides for the additional compression of data to be encoded by a form of statistical encoding, to reduce the amount of information to be transmitted by the system to the bare minimum. The method and system for compressing color video data can achieve a significant elimination of extraneous noise introduced by a video camera, and can result in a significant improvement in coding of the minimum amount of information necessary to reconstruct color video picture frames in a real time sequencing of video pictures.

Although the invention has been described in the context of a video telephone conferencing system, the invention may be also be adapted for use in compressing color video data on magnetic media, such as hard disks or high capacity magnetic floppy discs which may be used in storing and communicating such data via computer systems, or on video discs for video disc players which could transmit the information in the form of a video movie.

Although one specific embodiment of the invention has been described and illustrated, it is clear that it is susceptible to numerous modifications and embodiments within the ability of those skilled in the art and without the exercise of the inventive facility. Thus, it should be understood that various changes in form, detail and application of the present invention may be made without departing from the spirit and scope of this invention.

I claim:

1. A method of compressing digital color video data in a video communication system for transmitting a plurality of video picture frames, with each picture frame comprising a plurality of scan lines composed of a plurality of pixels, utilizing a digitized color video signal having three digital color components, said system including means for determining a luminance function for each pixel, means for determining which of said pixels on each scan line represent decision points based upon said luminance function, and means for encoding at least a portion of said plurality of pixels in each scan line as a plurality of combinations of run lengths and said three digital color components, said run length being of a first digital word size, and said three digital color components being of second, third and fourth digital word sizes, respectively, comprising the steps of:
   (a) encoding all of said digital color components in said picture frame according to a look up table in a memory means of digitally compressed color codes of the most visually significant color combinations of a fifth digital word size smaller than the sum of said second, third and fourth digital word sizes; and
   (b) encoding a plurality of run lengths and said digitally compressed color codes representing at least a portion of said picture frame in said memory means.

2. The method of claim 1, further including the step of modifying said look up table by determining up to a predetermined number of the most visually significant combinations of said color components in at least a portion of said picture frame, and substituting at least one of said determined most visually significant combinations of color components for at least one corresponding color combination in said look up table.

3. The method of claim 1, further including the step of concatenating adjacent run lengths on each scan line for which said adjacent run lengths have associated color components which vary less than a predetermined color difference threshold to a sixth digital word size which is larger than said first digital word size.

4. The method of claim 1, further including the step of statistically encoding in said memory means at least one of said run length portion and said color component portion of said combination of run length and color components by determining the frequency of occurrence of values of said at least one portion, providing a plurality of different code tables, selecting the most frequent occurrence, representing said most frequent occurrence in a first code table by a one bit size digital word, selecting the next three most frequent occurrences in said at least one portion, representing said next three most frequent occurrences in a second code table by a two bit digital size word, and representing all of the other values in said at least one portion in at least one additional code table by a digital word size larger than two bits.

5. The method of claim 1, further including the step of encoding a table in said memory means of run lengths and digitally compressed color codes representing only those differences from one scan line to the next adjacent scan line in a picture frame in one direction, for each picture frame.

6. The method of claim 1, further including encoding a table in said memory means of differences of said run length and color code combinations sequentially from one picture frame to the next picture frame.

7. The method of claim 1, further including determining for each picture frame which of said combinations of run length and compressed color codes have changed and which have not changed from one picture frame to the next sequential picture frame, and encoding in said memory means only those combinations of run length and compressed color codes which have changed.

8. The method of claim 1, further including the step of determining distinctive edges of a sequence of combinations of run length and compressed color codes in at least one scan line for each picture frame, and encoding a table of changes in at least one of said sequences between said distinctive edges as a table in said memory means representing a movement of said sequence from one frame to another frame sequentially.

9. The method of claim 8, wherein said movement encoded is selected from the group consisting of the horizontal shifting, shrinking, growing, horizontal shifting and vertical displacement vertical displacement, horizontal shifting and shrinking, horizontal shifting and growing, horizontal shifting and vertical displacement, vertical displacement and shrinking, and vertical displacement and growing.

10. A system for compressing digital color video data in a video communication system for transmitting a plurality of video picture frames, with each picture frame comprising a plurality of scan lines composed of a plurality of pixels, utilizing a digitized color video signal having three digital color components, said video communication system including means for determining a luminance function for each pixel, means for determining which of said pixels on each scan line represent decision points based upon said luminance function, and means for encoding at least a portion of said plurality of pixels in each scan line as a plurality of combinations of run lengths and said three digital color components in a memory means, said run length being of a first digital word size, and said three digital color components being of second, third, and fourth digital word sizes, respectively, said system of compressing digital color video data comprising:

(a) means for encoding all of said digital color components in said picture frame according to a look up table in a memory means of digitally compressed color codes of the most visually significant color combinations of a fifth digital word size smaller than the sum of said second, third and fourth digital word sizes; and (b) means for encoding a plurality of run lengths and said digitally compressed color codes representing at least a portion of said picture frame in said memory means.

11. The system of claim 10, further including means for modifying said look up table by determining up to a predetermined number of the most visually significant combinations of said color components in at least a portion of said picture frame; and substituting at least one of said determined most visually significant combinations of color components for at least one corresponding color combination in said look up table.

12. The system of claim 10, further including means for concatenating adjacent run lengths on each scan line for which said adjacent run lengths have associated color components which vary less than a predetermined color difference threshold to a sixth digital word size which is larger than said first digital word size.

13. The system of claim 10, further including means for statistically encoding in said memory means at least one of said run length portion and said color component portion of said combination of run length and color components by determining the frequency of occurrence of values of said at least one portion, providing a plurality of different code tables, selecting the most frequent occurrence, representing said most frequent occurrence in a first code table by a one bit size digital word, selecting the next three most frequent occurrences in said at least one portion, representing said next three most frequent occurrences in a second code table by a two bit digital size word, and representing all of the other values in said at least one portion in at least one additional code table by a digital word size larger than two bits.

14. The system of claim 10, further including means for encoding a table in said memory means of run lengths and digitally compressed color codes representing only those differences from one scan line to the next adjacent scan line in a picture frame in one direction, for each picture frame.

15. The system of claim 10, further including means for encoding a table in said memory means of differences of said run length and color code combinations sequentially from one picture frame to the next picture frame.

16. The system of claim 10, further including means for determining for each picture frame which of said combinations of run length and compressed color codes have changed and which have not changed from one picture frame to the next sequential picture frame, and encoding in said memory means only those combinations of run length and compressed color codes which have changed.

17. The system of claim 10, further including means for determining distinctive edges of a sequence of combinations of run length compressed color codes in at least one scan line for each picture frame, and encoding a table in said memory means of changes in at least one of said sequences between said distinctive edges as a table in said memory means representing a movement of said sequence from one frame to another frame sequentially.

18. The system of claim 17, wherein said movement encoded is selected from the group consisting of the horizontal shifting, shrinking, growing, horizontal shifting and vertical displacement, vertical displacement, horizontal shifting and shrinking, horizontal shifting and growing, horizontal shifting and vertical displacement, vertical displacement and shrinking, and vertical displacement and growing.

* * * * *